United States Patent
Fux

(10) Patent No.: US 7,916,046 B2
(45) Date of Patent: Mar. 29, 2011

(54) APPARATUS AND METHOD FOR INPUT OF IDEOGRAPHIC KOREAN SYLLABLES FROM REDUCED KEYBOARD

(75) Inventor: Vadim Fux, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/651,503

(22) Filed: Jan. 4, 2010

(65) Prior Publication Data

US 2010/0102998 A1   Apr. 29, 2010

Related U.S. Application Data

(60) Division of application No. 11/451,551, filed on Jun. 12, 2006, now Pat. No. 7,671,765, which is a continuation of application No. 10/282,518, filed on Oct. 29, 2002, now Pat. No. 7,061,403.

(60) Provisional application No. 60/393,997, filed on Jul. 3, 2002.

(51) Int. Cl.
  *H03M 11/00*   (2006.01)
(52) U.S. Cl. .............. 341/28; 345/171; 400/171; 704/8; 715/265
(58) Field of Classification Search .............. 341/28; 345/171; 400/484; 704/8; 715/265
  See application file for complete search history.

(56) References Cited

U.S. PATENT DOCUMENTS

| | | |
|---|---|---|
| 5,818,437 A | 10/1998 | Grover et al. |
| 5,945,928 A | 8/1999 | Kushler et al. |
| 5,952,942 A | 9/1999 | Balakrishnan et al. |
| 6,300,934 B1 | 10/2001 | Ko et al. |
| 6,487,424 B1 | 11/2002 | Kraft et al. |
| 6,801,659 B1 * | 10/2004 | O'Dell .......................... 382/185 |
| 6,822,585 B1 | 11/2004 | Ni et al. |
| 6,847,311 B2 | 1/2005 | Li |
| 6,864,809 B2 | 3/2005 | O'Dell et al. |
| 7,257,528 B1 * | 8/2007 | Ritchie et al. ..................... 704/7 |
| 2003/0074185 A1 * | 4/2003 | Kang ................. 704/2 |
| 2003/0190181 A1 | 10/2003 | Kim |
| 2004/0121817 A1 | 6/2004 | Tng et al. |
| 2004/0239534 A1 | 12/2004 | Kushler et al. |
| 2005/0144566 A1 | 6/2005 | Zhang |
| 2009/0284471 A1 * | 11/2009 | Longe et al. .................. 345/168 |

FOREIGN PATENT DOCUMENTS

EP   1 085 401 A1   3/2001

* cited by examiner

*Primary Examiner* — Timothy Edwards, Jr.
(74) *Attorney, Agent, or Firm* — Finnegan, Henderson, Farabow, Garrett & Dunner, LLP

(57) ABSTRACT

A method is for input of text symbols into an electronic device having a reduced keyboard. The reduced keyboard has keys representing a plurality of characters. The method includes receiving character inputs from the reduced keyboard and identifying symbol variants based on the received character inputs. A list of symbol variants is displayed. An input symbol from the list of symbol variants is selected, wherein the input symbol is a Korean Hangul syllable. At least one Chinese Hanzi syllable is designated, to correspond to at least one Korean Hangul syllable. The Korean Hangul syllable is replaced with a Chinese Hanzi syllable.

10 Claims, 6 Drawing Sheets

| Number of First Non-zero Hangul Syllable (2 bytes) ⌐ 102 | Number of Second Non-zero Hangul Syllable (2 bytes) ⌐ 106 | . . . | Number of Last Non-zero Hangul Syllable (2 bytes) ⌐ 110 |
|---|---|---|---|
| Frequency of First Non-zero Hangul Syllable (2 bytes) ⌊ 104 | Frequency of Second Non-zero Hangul Syllable (2 bytes) ⌊ 108 | . . . | Frequency of Last Non-zero Hangul Syllable (2 bytes) ⌊ 112 |

| Frequency of First Leading Consonant (1 byte) ⌊ 114 | Frequency of Second Leading Consonant (1 byte) ⌊ 116 | | Frequency of Last Leading Consonant (1 byte) ⌊ 118 |
|---|---|---|---|

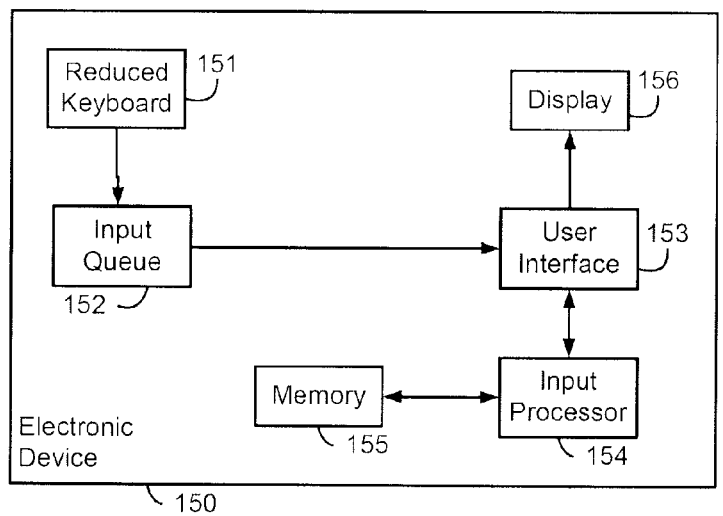
FIG. 21
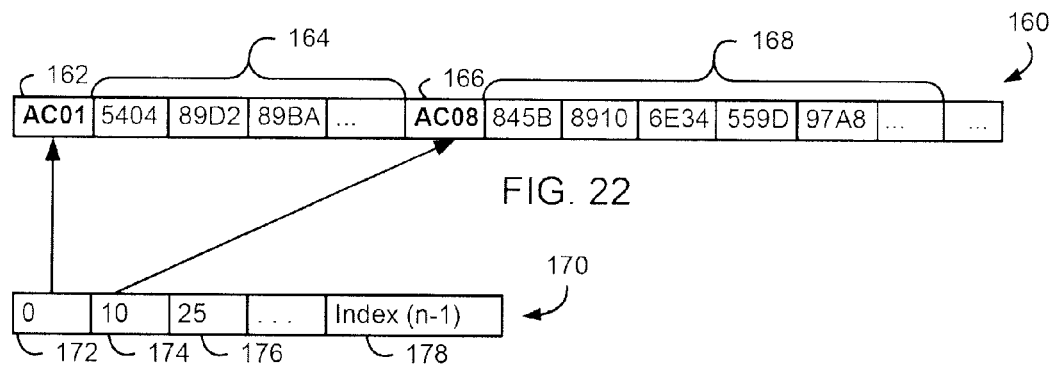
FIG. 22
FIG. 23
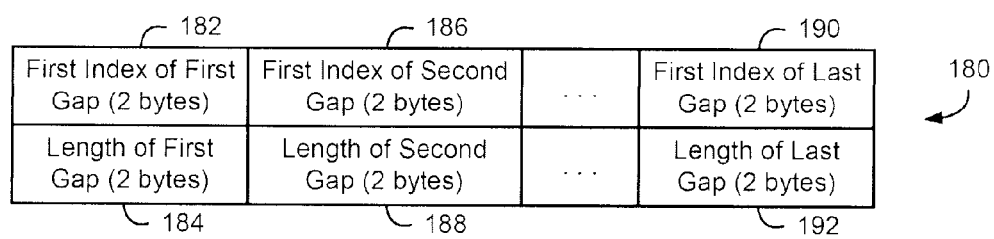
FIG. 24

APPARATUS AND METHOD FOR INPUT OF IDEOGRAPHIC KOREAN SYLLABLES FROM REDUCED KEYBOARD

CROSS-REFERENCE TO RELATED APPLICATIONS

This application is a divisional of U.S. application Ser. No. 11/451,551 filed Jun. 12, 2006, which is a continuation of U.S. application Ser. No. 10/282,518 filed Oct. 29, 2002 (now U.S. Pat. No. 7,061,403), which claims the benefit of U.S. Provisional Application No. 60/393,997 filed Jul. 3, 2002, all three applications hereby incorporated herein by reference.

BACKGROUND

1. Technical Field

This invention relates generally to data input on electronic devices, and in particular to input of ideographic Korean syllables from reduced keyboards.

2. State of the Art

The Korean language, like most Asian languages, is comprised of thousands of symbols, making it impossible to represent all the symbols on a keyboard. As such, several keystrokes are normally required to enter a single symbol. For example, Korean symbols include basic Jamo characters, compound Jamo characters, and Hangul syllables. Compound Jamo characters and Hangul syllables are built from basic Jamo characters. The basic Jamo characters include 19 leading consonants, 21 vowels, and 28 trailing consonants, whereas the total number of possible Hangul syllables is 11,172.

When reduced keyboards or keypads containing multiple-character keys, such as those found on electronic devices, are used for Korean text input, this problem is further compounded. Entry of each basic Jamo character typically requires a user to depress a single key multiple times, and entry of a compound Jamo character or Hangul syllable requires entry of several basic Jamo characters. Therefore, entry of a single symbol may require many keystrokes.

In order to alleviate the problem of character composition, input methods were designed and developed, containing the required logic for the Korean language based on composition rules, to convert keystrokes of users into appropriate symbols. However, these conversions according to known input methods are often ambiguous or incorrect, forcing a user to either select an intended symbol from a plurality of possible symbols generated by the input method or correct an incorrect symbol generated by the input method. Such symbol selection or correction makes text input slow and tedious, and the use of devices with reduced keypads very inconvenient.

SUMMARY

According to an aspect of the invention, a method for input of text symbols into an electronic device comprising a reduced keyboard having keys representing a plurality of characters is provided. The method comprises the steps of receiving character inputs from the reduced keyboard, identifying symbol variants based on the received character inputs, grouping each symbol variant in one of a plurality of groups of symbol variants according to a type of the symbol variant, each of the plurality of groups having an associated priority, ranking the symbol variants within at least one of the groups of symbol variants in decreasing order of frequencies of use of the symbol variants, displaying a list of symbol variants comprising the plurality of groups of symbol variants in order of decreasing priority, and selecting an input symbol from the list of symbol variants, wherein the symbol variants of the at least one of the groups of symbol variants are sorted by both priority and frequency of use.

A system of inputting text symbols into an electronic device in accordance with another aspect of the invention comprises a reduced keyboard having keys representing a plurality of characters for composing text symbols, an input queue configured to receive character inputs from the reduced keyboard, a memory configured to store frequency of use information for a plurality of symbols, an input processor operatively coupled to the memory and the input queue and configured to identify possible symbol variants comprising text symbols at least partially composed of the received character inputs, to assign each of the symbol variants to one of a plurality of groups of symbol variants having associated priorities according to a type of the symbol variant, to sort the symbol variants within at least one of the groups based on the frequency of use information stored in the memory, and to select an input symbol from the list of symbol variants, a display; and a user interface coupled between the display and the input processor to display a list of symbol variants comprising the groups of symbol variants in order of decreasing priority on the display.

In a further embodiment of the invention, a computer-readable medium is provided, the medium storing software code instructions for inputting text symbols into an electronic device comprising a reduced keyboard representing a plurality of characters, the software code instructions comprising instructions for performing the functions of receiving character inputs from the reduced keyboard, identifying symbol variants based on the received character inputs, grouping each symbol variant in one of a plurality of groups of symbol variants according to a type of the symbol variant, each of the plurality of groups having an associated priority, ranking the symbol variants within at least one of the groups of symbol variants in decreasing order of frequencies of use of the symbol variants, displaying a list of symbol variants comprising the plurality of groups of symbol variants in order of decreasing priority, and selecting an input symbol from the list of symbol variants, wherein the symbol variants of the at least one of the groups of symbol variants are sorted by both priority and frequency of use.

Further features of the invention will be described or will become apparent in the course of the following detailed description.

BRIEF DESCRIPTION OF THE DRAWINGS

FIG. 18 is a block diagram of a data structure for storing frequency of use information for Hangul syllables.

FIG. 19 is a block diagram of a data structure for storing frequency of use information for leading consonants.

FIG. 21 is a block diagram of a system of inputting Korean syllables.

FIG. 22 shows a correspondence array between Korean Hangul syllables and Chinese Hanzi syllables.

FIG. 23 shows an array of offsets in the correspondence array of FIG. 22.

FIG. 24 shows a jumping table for a frequency data structure.

DETAILED DESCRIPTION

As described above, symbols in the Korean language include basic Jamo characters, compound Jamo characters, and Hangul syllables. The basic Jamo characters are used to build the compound Jamo characters and the Hangul syllables. All of the Jamo characters, including both basic and compound Jamo characters are covered by the Unicode range 0x1100-0x11F9. These Jamo characters are classified into three categories, according to their position in a sequence of text input. Examples of characters in each category are shown in FIGS. 1-6 and described below.

Figure 1:
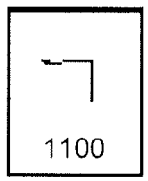
FIG. 1 shows an example of a basic leading consonant.
Figure 2:
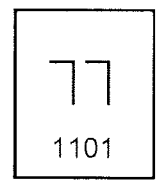
FIG. 2 shows an example of a compound leading consonant.

A "choseong" character is a leading consonant or syllable-initial character. FIG. 1 shows an example of a basic leading consonant, and FIG. 2 shows an example of a compound leading consonant. Choseong characters reside in the Unicode range 0x1100-0x1159. The leading consonants shown in FIGS. 1 and 2 are Unicode characters 0x1100 and 0x1101, respectively.

Figure 3:
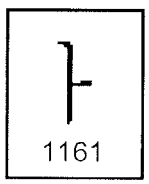
FIG. 3 shows an example of a basic medial vowel.
Figure 4:
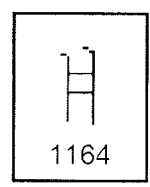
FIG. 4 shows an example of a compound medial vowel.

Examples of "jungseong" characters, also known as medial vowels or syllable-peak characters, are shown in FIGS. 3 and 4. FIG. 3 shows an example of a basic medial vowel, and FIG. 4 shows an example of a compound medial vowel. Unicode characters 0x1161 and 0x1164 are shown in FIGS. 3 and 4, although medial vowels occupy the Unicode range 0x1160-0x11A2.

Figure 5:
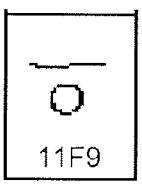
FIG. 5 shows an example of a basic trailing consonant.
Figure 6:
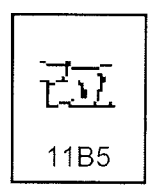
FIG. 6 shows an example of a compound trailing consonant.

FIGS. 5 and 6 show an example of a basic trailing consonant and an example of a compound trailing consonant. Basic trailing consonants, also referred to a "jongseong" characters or syllable-final characters, are found in the Unicode range 0x11A8-0x11F9. Unicode characters 0x11F9 and 0x11B5 are shown in FIGS. 5 and 6.

The leading, medial, and trailing categories, as well as the level of complexity of a character, basic or compound, are important for reduced keyboards. As those skilled in the art will appreciate, reduced keyboards are generally implemented in electronic devices to conserve space where the size of the device is to be minimized. Mobile telephones and other mobile communication devices, personal digital assistants (PDAs), and remote controls are examples of electronic devices that include reduced keyboards.

Figure 7:
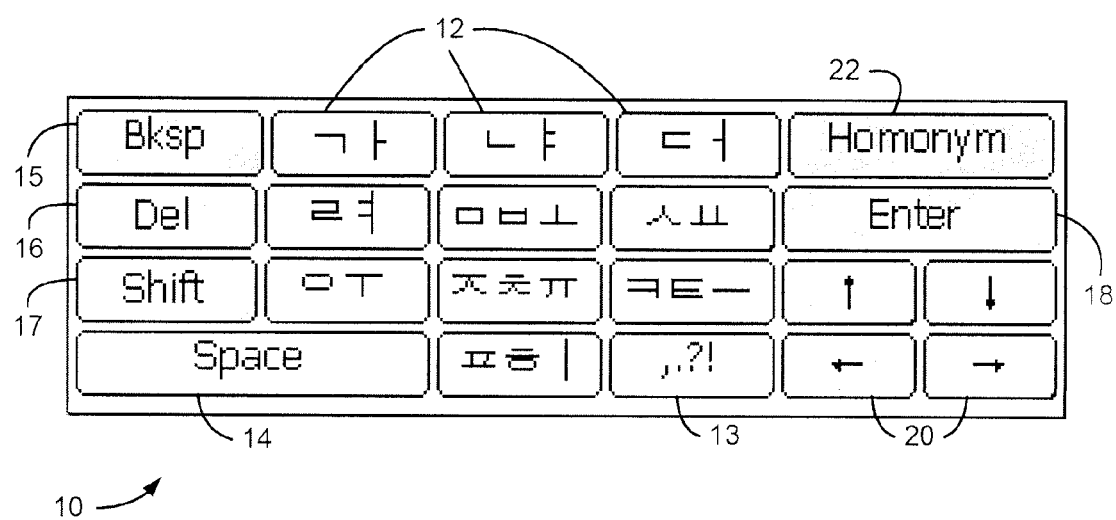
FIG. 7 is a block diagram showing a reduced keyboard which includes both basic consonants and vowels.

Reduced keyboards for Korean input may include consonants or both consonants and vowels. Since compound Jamo characters and Hangul syllables can be built from basic Jamo characters, reduced keyboards typically include basic characters only. FIG. 7 is a block diagram showing a reduced keyboard which includes both basic consonants and vowels.

The reduced keyboard 10 of FIG. 7 comprises a plurality of multiple-character keys 12, each multiple-character key having two or more basic Jamo characters. Associating multiple characters with each multiple-character key 12 allows a number of characters to be represented on the reduced keyboard 10 with fewer keys than the number of characters. Although the reduced keyboard 10 includes only 10 multiple-character keys 12, 24 characters are represented. As described in further detail below, the multiple-character keys 12 may be used to input many more characters and symbols in accordance with aspects of the invention.

The reduced keyboard 10 also includes a punctuation key 13, which is used to enter punctuation marks. Other common keyboard keys provided in the reduced keyboard 10 include a space bar 14, a backspace key 15, a delete key 16, a shift key 17, and an enter key 18. Navigation of a cursor on a display screen of an electronic device when data is being entered using the reduced keyboard 10 is enabled by the arrow keys 20.

The homonym key 22 is used when a user wishes to replace a composed Korean Hangul syllable with a corresponding Chinese Hanzi character, as will be described in further detail below.

Figure 8:
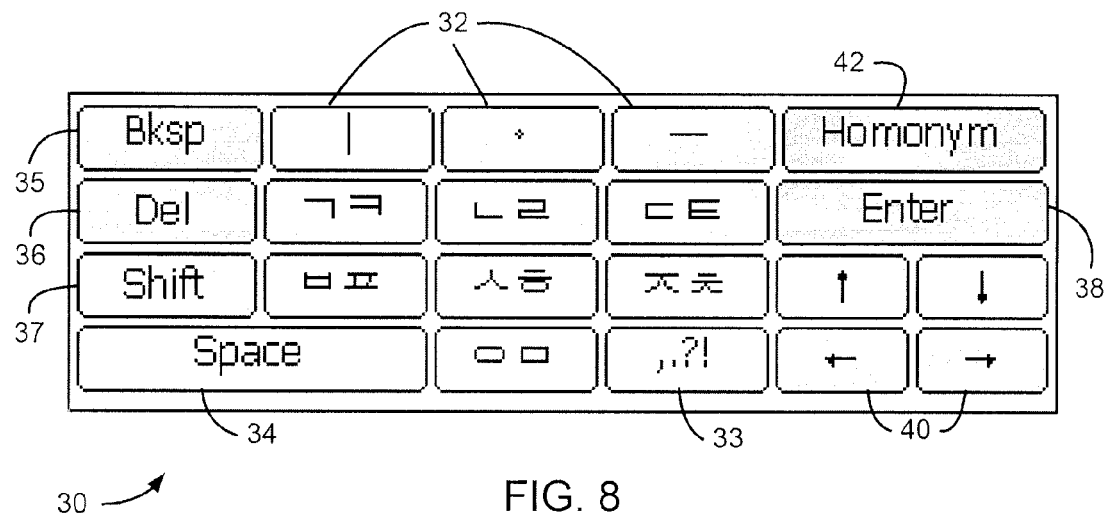
FIG. 8 is a block diagram of another reduced keyboard, with a reduced key layout including all the basic consonants.

FIG. 8 is a block diagram of another reduced keyboard, with a reduced key layout including all the basic consonants. The reduced keyboard 30 is substantially the same as the reduced keyboard 10, including a plurality of keys 32, at least some of which are multiple-character keys, a punctuation key 33, a space bar 34, a backspace key 35, a delete key 36, a shift key 37, an enter key 38, arrow keys 40, and a homonym key 42. However, character assignments for the reduced keyboard 30 differ from those of the reduced keyboard 10, in that the reduced keyboard 30 includes all of the basic Jamo consonants. Using the reduced keyboard 30, basic vowels are composed from the basic consonants.

Figure 9:
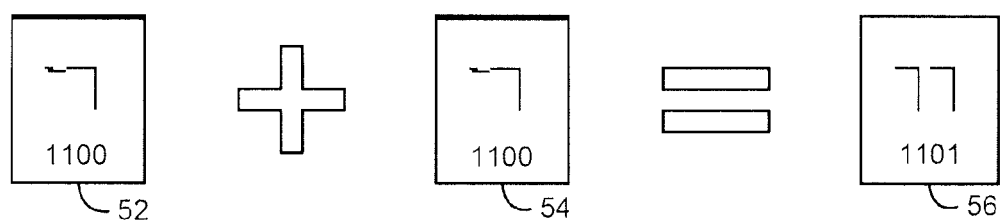
FIG. 9 shows an example of composition of a compound leading consonant from the basic leading consonants.

Compound Jamo characters and Hangul syllables can be built or composed from the basic Jamo characters represented on a reduced keyboard, such as the reduced keyboard 10 or 30. FIG. 9 shows an example of composition of a compound leading consonant from the basic leading consonants. In FIG. 9, the compound leading consonant 0x1101, shown at 56, is composed using the basic leading consonant 0x1100, shown at 52 and 54, by entering the basic leading consonant 0x1101 twice.

Figure 10:
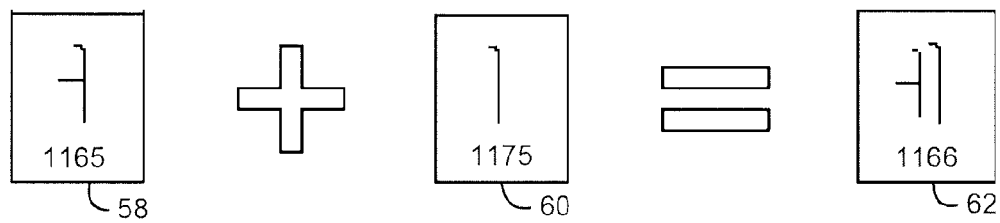
FIG. 10 shows an example of composition of a compound medial vowel from the basic leading consonants.
Figure 11:
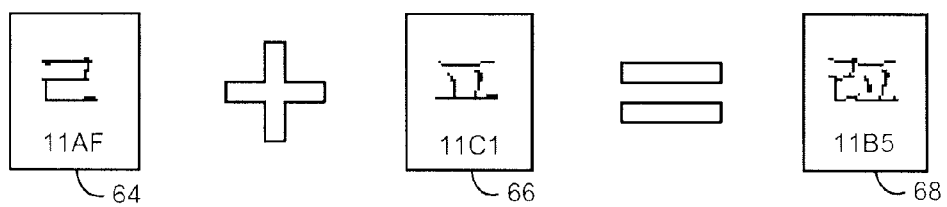
FIG. 11 shows an example of composition of a compound trailing consonant from the basic leading consonants.

FIGS. 10 and 11 show further examples of compound Jamo character composition. FIG. 10 shows an example of composition of a compound medial vowel from the basic leading consonants, wherein the medial vowel 0x1166, shown at 62, is composed from the basic medial vowels 0x1165, at 58, and 0x1175, at 60. FIG. 11 shows an example of composition of a compound trailing consonant from the basic leading consonants. In FIG. 11, the compound trailing consonant 0x11B5 (68) is composed from the basic trailing consonants 0x11AF (64) and 0x11C1 (66).

The other compound Jamo characters are composed using the basic Jamo characters in a similar manner.

All of the 11,172 Hangul syllables reside in the 0xAC00-0xD7A3 Unicode range, and are also composed from Jamo characters. Each Hangul syllable can be represented by a sequence of Jamo characters entered in a given order. There are two formats of Hangul syllable, shown in FIGS. 12 and 13.

Figure 12:
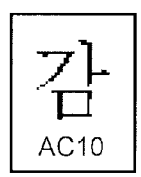
FIG. 12 shows a Hangul syllable having a leading consonant, a medial vowel and a trailing consonant.
Figure 13:
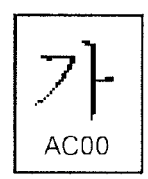
FIG. 13 shows a Hangul syllable that having a leading consonant and a medial vowel.

FIG. 12 shows a Hangul syllable having a leading consonant, a medial vowel and a trailing consonant. This format of Hangul syllable, abbreviated "LVT", for leading consonant, medial vowel and trailing consonant, includes the Unicode character 0xAC10. FIG. 13 shows a Hangul syllable that having a leading consonant and a medial vowel, which is abbreviated herein to an "LV" syllable. Unicode character 0XAC00 is an example of an LV Hangul syllable.

The systems and methods described herein provide for inputting ideographic Korean characters and syllables from reduced keyboards. Compound symbols, including both compound Jamo characters and Hangul syllables, that are not represented on reduced keyboards are composed from a limited set of characters that are represented on the keyboards.

Conversion of a Jamo character sequence to Hangul syllables follows composition rules and procedures. In compound character composition, each step of user input generated by depressing keys on a keyboard is based on previous user input, which includes one or more characters depending upon the key mapping of the particular reduced keyboard, conversion rules, and frequency of use for Hangul syllable, Jamo characters, and different composition formats. According to Korean grammar rules, Jamo characters are used only in composition of Hangul syllables. Therefore, although a user provides inputs to compose sequences of Jamo characters, the result of user inputs is a series of Hangul syllables.

As described above, all of the Hangul syllables have either an LV or an LVT format, each of which has a corresponding input scheme or character sequence. In both cases, the user begins input with a leading consonant. Compound consonants (both leading and final) are not normally represented on reduced keyboards, but can be composed from basic characters represented on a reduced keyboard. For example, as shown in FIG. 9, the consonant compound leading consonant 0x1101 is the result of a double input of the basic consonant character 0x1100. Following a leading consonant, a medial vowel is expected. Compound medial vowels are also not typically represented on the reduced keypads, but can be composed from a sequence of basic vowel character inputs, as shown in FIG. 10.

At this point, the user input may be completed, because there are Hangul characters that are composed with the LV scheme, such as the Hangul syllable "GA", 0xAC00, in FIG. 13. Otherwise, input of a trailing consonant is expected when an LVT Hangul syllable such as the Hangul syllable "GAM" 0xAC10 (FIG. 12), is composed with the LVT scheme.

Figure 14:
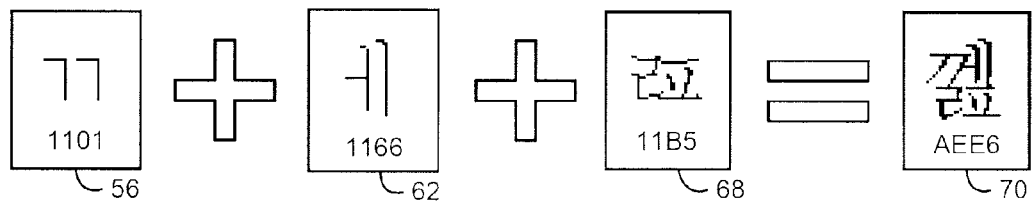
FIG. 14 illustrates composition of a Hangul syllable from compound characters.

The Hangul syllables shown in FIGS. 12 and 13 are composed from basic Jamo characters. However, many Hangul syllables include one or more compound Jamo characters. This type of Hangul syllable is composed by sequentially entering basic characters in a sequence such that each basic and/or compound character is composed in the order that they appear in the desired Hangul syllable. FIG. 14 illustrates composition of a Hangul syllable from compound characters.

As shown in FIG. 14, the "GGELP" Hangul syllable 0xAEE6, 70, is composed the compound Jamo characters 0x1101 (56), 0x1166 (62), and 0x11B5 (68). Using a reduced keyboard on which only basic Jamo characters are represented, the Jamo character 0x1101 is composed by a double entry of the basic character 0x1100, as shown in FIG. 9 and described above. The compound Jamo characters 0x1166 and 0x11B5 are similarly composed using a reduced keyboard by entering the basic characters 0x1165 and 0x1175 (FIG. 10), and 0x11AF and 0x11C1 (FIG. 11). Thus, the Hangul syllable AEE6 may be composed by a user by making keystrokes on a reduced keyboard to enter the following basic Jamo characters: 0x1100, 0x1100, 0x1165, 0x1175, 0x11AF, and 0x11C1.

A primary shortcoming of known input systems and methods for reduced keyboards is ambiguity in conversion from user input sequences of basic characters into ideographic Korean symbols. As described above, known systems and methods often require a user to select or correct symbols generated in response to user inputs.

It should be apparent from the foregoing that a sequence of characters input by a user may be converted into several types of input symbols, including Hangul syllables, compound Jamo characters, basic Jamo characters as input by the user, and sequences of characters that cannot be used as a basis of composition because they do not meet Korean grammar rules. According to an aspect of the invention, the user is presented with a list of choices of possible input symbol variants based on characters entered by the user. Symbol variants are ordered in the list based on sorting rules described in further detail below.

The variants for any sequence of basic characters input by a user are first grouped and ranked according to a priority based on the type of the variant. Hangul syllables have the highest priority. Second priority is given to compound Jamo characters, which are not Hangul syllables but are the result of correct user input of basic characters. Third priority is given to the basic Jamo characters input by the user. Last priority belongs to Jamo characters sequences that do not meet Korean grammar rules.

For each variant in at least some of the groups, a corresponding frequency of use is found, and the variants in each group are then ranked, within the group, by frequency of use. Variants are thereby ranked first by priority and then by frequency. For example, a Hangul syllable having a higher frequency of use than other variants that are also Hangul syllables has the highest overall priority and occurs first in a list of variants presented to a user. Hangul syllables, sorted by frequency, are listed first, followed in order of priority by any variants in the other groups, sorted in order of frequency within each group. The list of variants represents input predictions based on priority and, for at least some of the symbol variant groups, frequency of use of each symbol variant. In one embodiment of the invention, described in further detail below, both a Hangul syllable group and a leading consonant group are sorted by frequency. However, ranking by frequency of use offers little advantage for some of the symbol variant groups, such as sequences of characters that violate grammar rules. Although a user might occasionally wish to input this type of sequence, such sequences are generally used infrequently. Thus, storage of frequency of use information for these sequences and frequency-based ranking of these sequences could be avoided without significantly sacrificing the performance of the Korean syllable input system and method.

Figure 16:
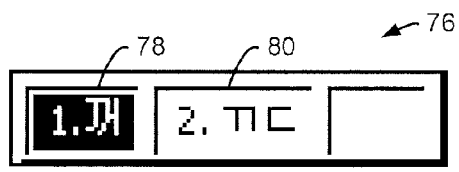
FIG. 16 shows a lookup window with variants sorted using frequency prediction.
Figure 17:
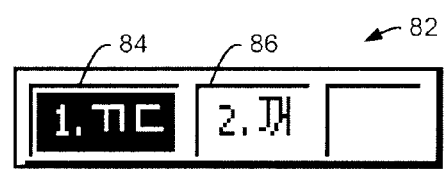
FIG. 17 shows a lookup window without frequency prediction.

Priority- and frequency-based prediction is an accurate and reliable mechanism that enables user input in Korean on electronic devices having reduced keyboards, making interaction with such devices more convenient and faster relative to known input systems and methods. The following example, with reference to FIGS. 15-17, illustrates the differences between input prediction schemes according to aspects of the invention and known input prediction schemes.

Figure 15A:
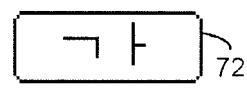
FIGS. 15(a) and 15(b) show two keys from the reduced keyboard of FIG. 7.
Figure 15B:

FIGS. 15(a) and 15(b) show two keys from the reduced keyboard 10 of FIG. 7. The keys in FIGS. 15(a) and 15(b) are both multiple-character keys 12 found in the top row of the reduced keyboard 10 (FIG. 7). The multiple-character key 72 represents the characters 0x1100 and 0x1161, and the multiple-character key 74 represents the characters 0x1103 and 0x1165. In order to input the Hangul syllable "GGEO" (0xAEBC) using the keyboard 10 of FIG. 7, the user depresses the key 72, and then the key 74. As described above, the Hangul syllable GGEO is composed from the compound Jamo character 0x1101, which can be composed from a double entry of the basic Jamo character 0x1100. According to an aspect of the invention, however, grammar rules and frequencies of use are used to identify possible symbol variants based on fewer keystrokes, such that the key 72 need only be depressed once, even though the desired Hangul syllable includes a compound leading consonant.

As shown in FIGS. 15(*a*) and 15(*b*), each of the keys 72 and 74 represents two characters. Therefore, four different input sequences are possible. Based on these input sequences, many more variants are possible. As described above, Hangul syllables, compound Jamo characters, basic Jamo characters, and sequences of characters that do not meet Korean grammar rules are all possible symbol variants when a user makes keystrokes using a reduced keyboard. When the user depresses the key 72, for example, it is possible that either of the basic Jamo characters 0x1100 or 0x1161 is intended, even though the Jamo character 0x1161, a medial vowel, violates Korean grammar rules if used on its own without a leading consonant. The character 0x1100, a leading consonant, may be used on its own as a basic leading consonant, or as a first basic character for composition of a compound leading consonant, to compose a Hangul syllable.

The key 74 represents the characters 0x1103, a basic leading consonant, and 0x1165, a basic medial vowel. The basic leading consonant 0x1103 might be intended on its own as the leading consonant in a next Hangul syllable, or as an initial basic character for composition of a compound leading consonant in the next Hangul syllable. The basic medial vowel 0x1165 could be intended as a basic medial vowel or part of a compound medial vowel, where the entry of the key 72 was intended to compose a compound leading consonant, for example.

For each possible basic Jamo character input, several compound Jamo characters and Hangul syllables may also be identified.

Clearly, the keystroke sequence of 72, 74 generates many possible variants. Each variant is identified based on the characters represented on the particular keys depressed and Korean language composition rules for LV and LVT Hangul syllables. Although other variants are possible, only two such variants are considered below for the purposes of illustration.

FIG. 16 shows a lookup window with variants sorted using frequency prediction. As shown in FIG. 16, the homonym lookup window 76 includes two symbol variants, 78 and 80. Both variants 78 and 80 interpret the keystroke of the key 72 as a composition of the compound Jamo character 0x1101. In the variant 78, which is the intended Hangul syllable GGEO, the subsequent keystroke of key 74 is interpreted as input of the medial vowel 0x1165 for composition of a Hangul syllable. The variant 80, however, is generated by interpreting the keystroke of key 74 as input of the leading consonant 0x1103. Although this is one possible symbol variant, the variant 80 is a character sequence that violates Korean grammar rules and cannot be used to compose a Hangul syllable, because it includes only a leading consonant and a trailing consonant, without a medial vowel.

In the lookup window 76, the variants are sorted according to the priority scheme described above, such that the Hangul syllable GGEO ranks higher in the list than the sequence of the Jamo characters 0x1101 and 0x1103. Where more than one symbol variant is a Hangul syllable, frequency of use information is obtained for each Hangul syllable, and the Hangul syllable variants are sorted according to frequency of use. Where frequency of use information is available for other symbol variant groups, symbols variants in these groups are similarly ranked by frequency of use.

FIG. 17 shows a lookup window without frequency prediction. In the lookup window 82, the variants are the same as shown in FIG. 16, although they have been sorted in a different order, as shown at 84 and 86. According to known techniques, variants are presented in an order in which they are stored in a memory, a "first found" scheme, or dependent upon the particular character mapping of multiple-character keys on a reduced keyboard. The intended input Hangul GGEO appears second in the lookup window 82, and a user must therefore select the intended input Hangul syllable. This selection may be made, for example, by using the arrow keys 20 on the keyboard 10 (FIG. 7) to move a cursor to the intended input text, in this case a Hangul syllable, and pressing the enter key 38. Those skilled in the art will appreciate that other types of input devices, including a thumbwheel, for example, may be used for input selection, where such input devices are provided in an electronic device.

According to an aspect of the invention, the first entry in a lookup window is preferably selected by default and displayed at a current text entry position on a text input screen on a display. Unless a user selects another variant, then the first entry is selected as an input when it is determined that composition of a Hangul syllable is complete, as described in further detail below. The user continually types as long as intended inputs are generated in the lookup window and displayed on the text input screen. Priority- and frequency-based ranking of variants provides reliable and accurate prediction of intended inputs, increasing the ease and speed of Korean text entry from reduced keyboards.

Three data structures are preferably used for composition of leading consonants, medial vowels and trailing consonants. These data structures are correspondence arrays between basic Jamo characters and compound Jamo characters. Each correspondence array is stored in a memory on an electronic device and used to identify possible input variants when a user provides inputs using a reduced keyboard.

Although Unicode numbers for each Jamo character may be used to index array elements, memory space requirements for these arrays may be reduced by normalizing indexes in the arrays with LBase, VBase and TBase, the Unicode numbers for the first leading consonant, medial vowel, and trailing consonant, respectively. Since Jamo characters occupy contiguous Unicode ranges, each Jamo character may be uniquely identified by a respective normalized index which indicates its position in the Unicode range. For example, the first leading consonant having a Unicode number of 0x1100 may be identified with the index 0 where LBase is selected as 0x1100. However, it should be apparent that other index schemes may instead be used to identify Jamo characters.

One embodiment of a correspondence array with indexes generated as described above, for compound leading consonants is as follows:

{0x1100-LBase, 0x1100-LBase, 0x1101-LBase},
    {0x1103-LBase, 0x1103-LBase, 0x1104-LBase},
    {0x1107-LBase, 0x1107-LBase, 0x1108-LBase} . . . .

For compound medial vowels, a similar correspondence array is shown below:

{0x1161-VBase, 0x1169-VBase, 0x116A-VBase},
    {0x1162-VBase, 0x1169-VBase, 0x116B-VBase},
    {0x1175-VBase, 0x1169-VBase, 0x116C-VBase} . . . .

A correspondence array for trailing consonants can similarly be generated as follows:

{0x11A8-TBase, 0x11A8-TBase, 0x11A9-TBase},
{0x11A8-TBase, 0x11BA-TBase, 0x11AA-TBase},
{0x11AB-TBase, 0x11BD-TBase, 0x11AC-TBase} . . . .

Although correspondences between basic and compound Jamo characters are known to those familiar with the Korean language, these arrays of indexes provide a compact data structure for storage of these correspondences.

In the above example of a user entering the GGEO Hangul from a reduced keyboard by entering a keystroke sequence of 72, 74 (see FIGS. 15(*a*) and 15(*b*)), the leading consonant correspondence array is searched after the key 72 has been depressed, and the corresponding compound character 0x1101 is identified as a possible variant. Generally, the compound character correspondence arrays are searched when a user has input characters that may be used to compose a compound character. As described above, although the key 72 represents two basic characters, the only possible compound leading consonant that a user might be composing is 0x1101. When character indexes for the leading consonant correspondence array are generated using LBase=0x1100, the first entry in the array is {0x00, 0x00, 0x01}. In this example, an input using the key 72 translates into an input of 0x00. For this input, the array entry {0x00, 0x00, 0x01} is found, and the compound leading consonant having an index of 0x01 is identified as a variant for that input.

Compound symbol variants for medial vowels are identified in a similar manner, where input keystrokes could possibly be intended to compose compound medial vowels. When the key 72 is depressed, a leading consonant is expected, since this is the first character input. Following a leading consonant, either another basic leading consonant, to compose a compound leading consonant, or a basic medial vowel is a valid input. As such, when the key 74 is then depressed, the basic medial vowel, 0x1165, could be intended as a medial vowel or as a first basic vowel for composing a compound medial vowel. The input of 0x1165 translate into index 0x05 when VBase=0x1160. The medial vowel correspondence array is searched to determine whether a compound medial vowel corresponds to the sequence of basic vowels, by determining whether any entry in the array begins with index 0x05. In this example, the medial vowel correspondence array would include an entry for at least the compound medial vowel 0x1166, as {0x05, 0x05, 0x06}, since the basic character 0x1165 (index 0x05) can be used to compose the compound medial vowel 0x1166 (index 0x06).

It should be appreciated that other input sequences are also possible. For example, the entry using the key 72 could be interpreted as entry of the medial vowel 0x1161 (index 0x01), and the subsequent entry using the key 74 could be interpreted as entry of the medial vowel 0x1165 (index 0x05), even though such an input sequence violates Korean grammar rules. In this case, the medial vowel correspondence array would not include an entry beginning with 0x01, 0x05, since these basic characters do not form a compound medial vowel.

For trailing consonants, similar operations are performed to identify possible compound symbol variants.

Compound character variants identified in this manner are grouped and possibly ranked as described above, and presented to the user in a lookup window with other symbol variants. The particular display method is dependent upon the type of electronic device in which the Korean input is enabled. Where the display method is dependent upon Unicode number, for example, Unicode numbers for identified compound character variants can be regenerated simply by adding the appropriate base number, LBase, VBase, or TBase, to the correspondence array indexes for the identified variants.

When at least leading consonant variants have been identified, Hangul syllable variants can be predicted. Any Hangul syllable which includes one of the leading consonant variants is itself a Hangul syllable variant for the input sequence. Frequency of use information for each Hangul syllable variant is then obtained, and the Hangul syllable variants are ranked in decreasing order of frequency of use, with the Hangul syllable variant having the highest frequency of use being ranked highest and thus occurring first in a lookup window or list of variants.

Frequency of use information, at least initially, comprises information indicative of how often each particular symbol is used. This information may be available from a variety of sources, including existing historical linguistic pattern records, for example. More targeted or user-specific frequency of use information may instead be generated on the basis of particular collections of Korean text. However, the present invention is in no way limited to frequency of use information from any particular source. Provided that the frequency of use information for at least one of the groups of variants is available during Korean text input, its source is not important.

In order to rank symbol variants based on frequency of use, frequency of use information for at least one of the symbol variant groups is stored on an electronic device. According to an embodiment of the invention, frequency of use information is stored for at least Hangul syllables. FIG. 18 is a block diagram of a data structure for storing frequency of use information for Hangul syllables.

The Hangul syllable frequency data structure 100 comprises a plurality of pairs of 2-byte Hangul syllable numbers and 2-byte frequencies of use. In FIG. 18, three such pairs 102/104, 106/108, and 110, 112 are shown as representative examples. Intervening pairs between the second pair 106/108 and the last pair 110/112 correspond to other respective Hangul syllables but have a similar structure.

Each Hangul syllable number in the data structure 100 uniquely identifies a Hangul syllable. Unicode numbers for Hangul syllables have been established and are preferably used in the data structure 100. However, other types of identifiers may instead be used in a frequency data structure. For example, since Hangul syllables reside in a contiguous Unicode range, each Hangul syllable can be identified with an index indicating its position in the Unicode range instead of the Unicode number. In order to represent each Hangul syllable, this index must be at least 14 bits in length, resulting in a saving of 2 bits of memory space per number/frequency pair. Where frequency of use information is stored for all Hangul syllables, the index itself need not be stored. In this situation, the position of a frequency of use entry for a Hangul syllable in an array of frequencies of use information corresponds to the index of the Hangul syllable. However, storage of syllable numbers or indexes in the frequency data structure 100 enables storage of frequency of use information for fewer than all of the Hangul syllables, to thereby conserve memory space. Syllable numbers also avoid the necessity of maintaining a particular order of entries, which is difficult where entries are added to and deleted from the frequency data structure 100.

Frequency of use information in the frequency data structure 100 is preferably a measure of relative frequency of each Hangul syllable. For example, the Hangul syllable having the highest frequency of use may have a frequency of use of 0, to indicate that it is the first Hangul syllable in decreasing order of frequency of use. The second most frequently used Hangul syllable then has a frequency of use of 1, and so on. In this manner, frequency of use information can be stored using the same number of bits as the Hangul numbers or indexes. Those skilled in the art will appreciate that absolute frequencies or numbers of occurrences of each syllable in a particular collection of Korean text used to generate frequency of use information, for example, or other types of relative frequencies of use may instead be stored in the frequency data structure 100.

Those skilled in the art will appreciate that several techniques may be used to identify possible Hangul syllable variants once leading consonants variants, and possibly medial vowel and trailing consonant variants, have been identified. A correspondence array or table, although relatively simple to implement and support, requires significant memory resources, as described above. Alternatively, mathematical algorithms may be used to determine Hangul syllables based on Jamo character variants. Using these algorithms and Unicode numbers, or possibly other indexes or identifiers, of Jamo characters, Unicode numbers, indexes, or identifiers of possible Hangul syllables are calculated. Where numbers resulting from such calculations represent valid Hangul syllables, the numbers are translated if necessary, depending upon how Hangul syllables are identified in the Hangul syllable frequency data structure 100, and used to access corresponding frequency of use information in the frequency data structure 100.

As described above, Jamo characters are used to compose Hangul syllables for input of Korean text. Jamo characters are not used on their own in Korean text. Therefore, a Korean syllable input system and method according to aspects of the present invention could be implemented using symbol variant sorting, and thus frequency of use information, for Hangul syllables only. In such an implementation, symbol variants are preferably grouped by type of symbol to maintain the priority ranking described above, but only variants in the Hangul syllables group are then ranked based on frequency of use.

In other embodiments, frequency of use information may also be stored for other types of symbol variants. FIG. 19 is a block diagram of a data structure for storing frequency of use information for leading consonants. The leading consonant frequency data structure 120 includes frequency of use information for leading consonants, a first, second, and last of which are shown at 114, 116 and 118. In the data structure 120, the frequency of use of each leading consonant is preferably a relative frequency of use, and is thus stored in a single byte. Relative frequency of use information in any data structure could be stored in more or less than one byte, depending upon the total number of symbols for the data structure. Consonant numbers or indexes are not necessary in the data structure 120, since frequency of use information is stored for every leading consonant. For example, as described above, leading consonants occupy a contiguous Unicode range and can be identified by an index. Frequency of use entries for each leading consonant can then be arranged in the data structure 120 such that the frequency of use information at a particular position in the data structure 120 relates to the leading consonant having the corresponding index.

Prediction accuracy generally improves with the amount of frequency of use information available. This improved accuracy is provided at the cost of additional memory space to accommodate more frequency of use information. Therefore, when implementing Korean syllable input systems or methods as described herein, trade-offs are made between prediction accuracy and memory requirements. If sufficient memory space is available, then frequency of use information for Hangul syllables and each type of Jamo character could be stored. Where memory space is limited or should be conserved, then frequency of use information could be stored only for Hangul syllables, or even just a certain number of the most frequently used Hangul syllables.

Figure 20:
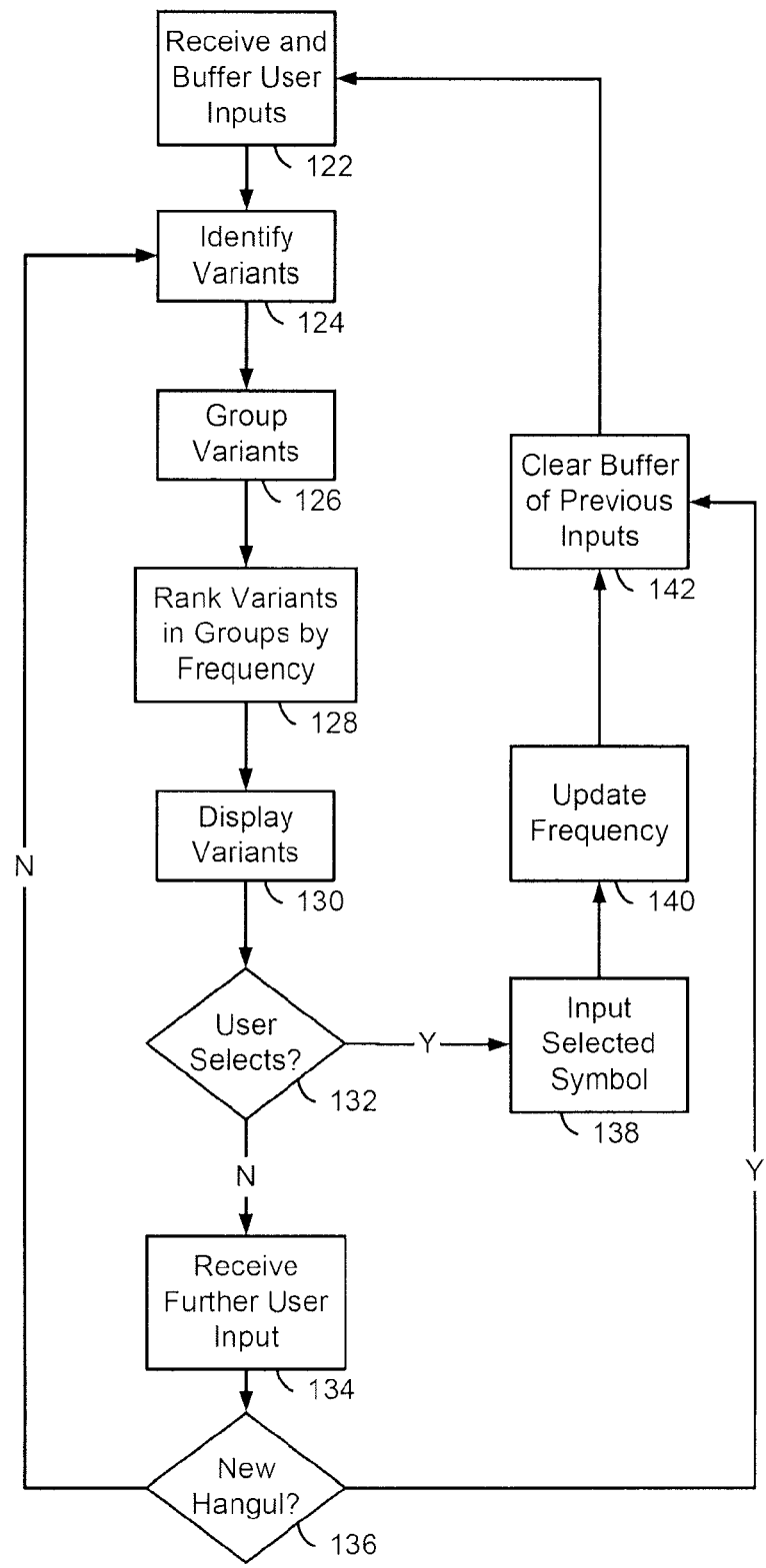
FIG. 20 is a flow diagram illustrating a method of inputting Korean syllables from a reduced keyboard.

FIG. 20 is a flow diagram illustrating a method of inputting Korean syllables from a reduced keyboard. The method begins at step 22 where user inputs are received and buffered. Since symbol predictions are based on one or more preceding inputs, as described above, at least two inputs are received from the user at step 122. When two or more inputs have been received at step 122, symbol variants are identified based on these inputs, at step 124. Symbol variants for a particular sequence of inputs may include Hangul syllables, compound Jamo characters, basic Jamo characters, and sequences of characters that cannot be used to form valid Korean text.

The identified variants are then grouped at step 126 by type of symbol. Hangul syllables are the highest priority group, followed by compound Jamo characters, basic Jamo characters, and character sequences that violate grammar rules. Variants in each group for which frequency of use information is available are then ranked by frequency of use, at step 128. Frequency of use information is available for at least Hangul syllables. When a Hangul syllable variants are identified, based on Jamo character variants, the frequency of use of each identified variant is obtained from the Hangul syllable frequency data structure. The Hangul syllables are then ranked in order of decreasing frequency of use. Where frequency of use information is available for other groups of symbol variants, the variants in these groups are similarly ranked.

As will be apparent from the above description of frequency data structures, frequency of use information may be available for only some variants in a group. For example, frequency of use information could be stored only for a predetermined number of most frequently used Hangul syllables, or perhaps for only one type of Jamo characters, such as leading consonants. In these situations, variants for which no frequency of use information is available are preferably ranked below those for which frequency of use information is available. This effectively assumes a zero frequency of use, or some other predetermined frequency of use lower than the lowest available frequency of use for variants in the same group, for these variants.

At step 130, a list of variants is displayed to a user, in a lookup window as described above, a menu, or some other pick list type of interface. The symbol variant having the highest overall ranking, a Hangul syllable if any Hangul syllable variants were identified at step 124, is also inserted at a current text entry position on a text input screen. It is then determined, at step 132, whether the user has made a symbol selection from the list of variants. The method proceeds at step 134 to receive a further keyboard input from the user at step 134 where the user has not made a symbol selection from the list of variants. Although initial and further user input steps are shown as separate steps 122 and 134, a user may continue to provide keyboard inputs while variants are being identified and ranked where the inputs are buffered, and the further input is then obtained from the buffer at step 134. For example, in one embodiment a text input system, user inputs are buffered in an input queue, such that step 134 involves receiving the further keyboard input from the input queue.

A determination is then made at step 136 whether the user has started to compose a new Hangul syllable. This determination is based on both the further user input received at step 134 and previous user inputs. Where the most recent user input was a medial vowel or trailing consonant, for example, and the further input is a leading consonant, then the user is entering characters to compose a new Hangul syllable. In this case, the buffer of previous inputs is cleared at step 142. The operations involved in clearing the input buffer are dependent upon how the buffer is implemented. Where the buffer is a circular queue, for example, previous inputs might not actually be deleted, but are eventually overwritten with subsequent inputs.

Processing then returns to step 122, where one or more new user inputs are received and buffered. Variants based on these inputs are identified, grouped, ranked and displayed, as described above. Composition of a new Hangul syllable at step 136 is also determined when a space bar on a reduced keyboard is depressed by the user. In this case, the further input need not be considered when identifying variants, and the method instead awaits two or more new inputs at step 122.

Where it is determined at step 136 that a new Hangul syllable is not being composed, such as where a backspace key or a keyboard key mapped to a medial vowel or trailing consonant, is input by the user, for example. If the further user input is generated by depressing a keyboard key representing one or more characters, then the method is repeated taking the further input into account to thereby provide an updated list of variants. Although new variants might be identified, grouped, ranked, and displayed at steps 124-130, a more likely result of the further input is to reduce the number of symbol variants. For example, many Hangul syllable variants may be possible based on a particular compound leading consonant composed using two initial user inputs received at step 122, whereas only a subset of such variants are possible when the further character is a medial vowel. In this situation, some variants are effectively removed from the list of variants. Where a maximum size is imposed on the list of variants, less frequently variants not displayed in a previous list of variants could also be added to the list of variants. If the further input is generated by the user by depressing a backspace key to remove an unintended or erroneous user entry, then the list of variants will likely be expanded. Although not explicitly shown in FIG. 20, where a backspace operation removes all previous entries, or all but one previous entry, being used to identify symbol variants, then processing returns to step 122 to await additional user input.

The user may select an intended symbol from the list of variants any time after a list of variants is first displayed. Where the user makes such a selection, as determined at step 132, the selected symbol is input to the electronic device and replaces the currently displayed highest-ranked symbol on the input screen. In order to provide for a measure of frequency of use adaptation or learning based on actual user input patterns, the frequency of selected symbols is preferably increased at step 140. Frequency of use data based on historical patterns or particular collections of Korean text might not be suitable for every situation or for every user. Step 140 provides a mechanism whereby symbols that are used frequently by a user eventually attain a higher ranking within their respective symbol groups. Although step 140 assumes that frequency of use information is available for the type of symbol selected, frequency of use information may, alternatively, be created when a symbol is selected by the user.

When a symbol is selected, then a current syllable composition operation is complete, and any subsequent user inputs must be intended to compose a new Hangul syllable. Previous inputs used to compose the selected symbol are therefore cleared at step 142, and the input method awaits user inputs at step 122.

FIG. 21 is a block diagram of a system of inputting Korean syllables. The system of FIG. 21 includes a reduced keyboard 151, an input queue 152, a user interface 153, an input processor 154, a memory 155, and a display 156, all implemented in an electronic device 150.

The reduced keyboard 151 includes keys which represent some, but not all, characters used for input of Hangul syllables. The keyboards shown in FIGS. 7 and 8 are examples of reduced keyboards, although the invention is in no way restricted to these, or any other, particular reduced keyboards. In the electronic device 150, user inputs from the reduced keyboard 151 are received by the input queue 152. These inputs are buffered in the input queue 152 as described above.

The user interface 153 provides an interface to the user of the electronic device 150. It accepts inputs from the user via the reduced keyboard 151, and also provides outputs to the user via the display 156. The user interface 153 displays, for example, a text input screen for composing Korean text, and list of Korean symbol variants, on the display screen 156.

The input processor 154 receives buffered inputs from the input queue 152, through the user interface 153, and identifies symbol variants based on the inputs. The input processor 154 also assigns the identified symbol variants into groups and accesses frequency of use information for at least one of the groups of symbols stored in the memory 155. The symbol variants in each group for which frequency of use information has been stored in the memory 155 are then sorted in order of decreasing frequency of use. An input symbol is selected from the list of symbol variants by the input processor 154, responsive to either a symbol selection by a user or the start of a new symbol, as described above.

The memory 155 comprises one or more data stores and is implemented using one or more types of storage component. Electronic devices such as 150 typically include both writeable memory, Random Access Memory (RAM) for example, and Read Only Memory (ROM), from which data may only be read. Writeable memory may be either volatile or non-volatile, although non-volatile memory such as Flash RAM or battery backed-up RAM is preferred when any data in the writeable memory should be maintained in the event of loss of power. The above correspondence arrays, the Hangul syllable frequency data structure, and any other frequency data structures are stored in the memory 155, preferably in non-volatile memory, and accessed as necessary when Korean text is being input to the electronic device. If the system of FIG. 21 supports learning or adaptation of frequency of use information, then frequency data structures are preferably stored in non-volatile writeable memory. Otherwise, frequency of use information may instead be stored in ROM.

The input queue 152, although shown as a separate block in FIG. 21, may actually be provided in writeable memory in the memory 155. The input queue 152 need not be in non-volatile memory, because it stores user inputs for only a single Hangul syllable at any time. The memory 155 may also store data for other systems on the electronic device 150, operating system software for the electronic device 150, and possibly software applications, modules and utilities which provide various electronic device functions. Korean text input techniques as described herein may be implemented, for example, as software instructions in a software application or a software module configured to operate in conjunction with one or more software applications to enable Korean text input for processing by such software applications.

The display 156 provides visual data output to a user of the electronic device 150. In portable electronic devices, for example, liquid crystal displays are often used.

User inputs for entering Korean text on the electronic device 150 are made by depressing keys on the reduced keyboard 151. Text entry may be invoked by the user, for example, by starting a particular software application, module, or utility, using a particular function supported on the electronic device 150. Whenever an operation or function requires input of Korean text, the Korean text input system processed user inputs to predict correct Korean Hangul syllables. Where more than one software application supports text input, for example, the Korean text input system is preferably implemented as a software module or utility that can be called or invoked by any of the software applications. Alternatively, each such software application may incorporate software instructions to perform Korean text input as described herein.

As will be apparent, the user interface 153 presents a text entry screen on the display 156 to aid in text entry. The particular content and formatting of the text entry screen is dependent, for example, upon the nature of the text being entered, the function for which text is being entered, or the software application currently in use. Text is displayed on the text entry screen as it is predicted by the Korean text entry system or selected by the user.

When user inputs have been received, the input processor 154 identifies symbol variants based on these inputs. Correspondence arrays stored in the memory 155 are accessed to identify compound leading consonant, medial vowel, and trailing consonant variants. Possible Hangul syllable variants are also identified. As described above, the input processor 154 groups the identified variants by type of symbol, and accesses frequency data structures in the memory 155 to sort the variants in each group for which frequency of use information is available.

A sorted list of variants is then displayed to a user on the display 156. As described above, the highest ranked symbol variant is also preferably displayed in a current position in the text entry screen. The sorted list of variants, although displayed on the same display 156 as the text entry screen, preferably does not obscure the user's view of the current position of the text entry screen. Alternatively, since the highest ranked variant is displayed in both the sorted list of variants and at the current position of the text entry screen, the Korean text entry system may be configured such that the sorted list of variants is displayed on the display 156 such that the highest ranked variant in the sorted list is displayed at the current position of the text entry screen. The position of the highest ranked variant in the sorted list then effectively overlies the current position of the text entry screen, such that the user sees the highest ranked variant at only one position on the text entry screen, and can more easily view both the highest variant and other variants in the sorted list at the current position in the text entry screen.

In response to selection of a symbol variant from the sorted list, the input processor 154 replaces the highest ranked symbol variant with the selected symbol at the current position in the text entry screen, updates the frequency of use information for the selected symbol if learning or adaptation is enabled, and clears the input queue 152. Selection of a symbol from the list may be accomplished, for example, using navigation keys on the reduced keyboard 151, or, alternatively, an auxiliary input device (not shown) such as a thumbwheel.

If the user does not select a symbol from the sorted list of variants, then the input processor 154 determines whether the user has started to compose a new Hangul syllable based on a further user input received from the reduced keyboard 151. Where a new Hangul syllable is being composed, the input queue 152 is cleared, and new symbol variants are identified, grouped, ranked, and displayed. Otherwise, the current list of variants is updated based on the further user input.

Although the above description refers to functions performed by the input processor 154, it will be appreciated by those skilled in the art that these functions of the input processor 154 are directed by software instructions in a software application, module, or utility in which a Korean text input method is implemented.

It will be appreciated that the above description relates to preferred embodiments by way of example only. Many variations on the systems and methods described above will be obvious to those knowledgeable in the field, and such obvious variations are within the scope of the invention as described and claimed, whether or not expressly described.

For example, those skilled in the art will appreciate that the Unicode standard recognizes both Old and New Jamo characters. A further data structure enables conversion of Old Jamo characters to New Jamo characters and vice versa. This data structure is preferably a correspondence array similar to the compound Jamo character correspondence arrays described above, having the following structure:

{0x1100, 0x3131},
{0x1101, 0x3132},
{0x1102, 0x3134},
{0x1103, 0x3137} . . . .

The first number in each entry in the above array is a Unicode number of an Old Jamo character, and the second number in each entry is the Unicode number of the corresponding New Jamo character. Correspondence between Old and New Jamo characters is not a strict correspondence between Unicode ranges, as is apparent from the above example correspondence array entries, but the character correspondence is fixed.

This Jamo replacement feature is enabled on an electronic device by storing the above correspondence array in memory on the electronic device and accessing the memory when an entered Old Jamo character is to be replaced by its corresponding New Jamo character. A Korean text input system or method may be configured to search the correspondence array and replace each Old Jamo character with its corresponding New Jamo character, if one exists, as Old characters are entered. Alternatively, character replacement may be configured as a function or utility that must be invoked by a user before or during each text entry operation. Although Unicode numbers are shown in the array above, indexes may instead be used, since both the Old Jamo characters and the New Jamo characters respectively reside in the contiguous Unicode ranges 0x1100-0x11FF and 0x3131-0x318E. For example, Old Jamo character indexes may be generated by subtracting the Unicode number of the first Old Jamo character (0x1100) from the Unicode number of each Old Jamo character which has a corresponding New Jamo character. New Jamo character indexes may similarly be generated by subtracting the Unicode number of the first New Jamo character (0x3131) from the Unicode number of each New Jamo character. Each entry in the Old/New Jamo character correspondence array are then only 4 bytes (a pair of 1-byte indexes) instead of 8 bytes (a pair of 2-byte Unicode numbers).

In addition, some of the Korean Hangul syllables can also be represented by Homonyms, which are Chinese Hanzi syllables. Replacement of Hangul syllables with Hanzi syllables is similarly enabled by further array data structures. These data structures are shown in FIGS. 22 and 23.

FIG. 22 shows a correspondence array between Korean Hangul syllables and Chinese Hanzi syllables. The array 160 is a static array of homonyms that contains Korean Hangul syllables and corresponding Chinese Hanzi syllables. For any Korean Hangul syllable, such as 162 and 166, there may be a number of possible corresponding Hanzi syllables, designated 164 and 168.

FIG. 23 shows an array of offsets in the correspondence array of FIG. 22. Each element 172, 174, 176, 178, as well as elements between 176 and 178, in the array of offsets 170 corresponds to the index of Korean syllables in the correspondence array 160. These arrays are used to find Hanzi syllable variants for a Korean syllable. Preferably, a user invokes Hangul/Hanzi syllable replacement on a per-syllable basis after a Hangul syllable has been entered, by depressing the homonym key on a keyboard, for example. The reduced keyboards shown in FIGS. 7 and 8 include a homonym key for this purpose. However, corresponding Hanzi syllable variants may instead be identified each time a Korean syllable that appears in the correspondence array is entered by a user. In the keyboards.

Searching of Hanzi syllables based on input of a Korean syllable is based on a correspondence between elements of two arrays. When a Korean Hangul syllable is input and the user invokes the syllable replacement function, an index of the Hangul syllable is searched in the array of offsets. The element at that index is the index of the Korean Hangul syllable in the correspondence array 160. The group of Chinese Hanzi syllable variants with which the Hangul syllable may be replaced follows the Hangul syllable in the array of sequences. The number of elements in the group of variants can be calculated as one less than the difference between the values of two elements in the array of offsets. For the first Hangul syllable 0xAC01 at index 0, for example, the Hanzi syllables 164 are all possible variants with which the Hangul syllable may be replaced. Since the Hangul syllable 0xAC08 appears in the correspondence array at index 10, as shown in the array of offsets 170 at 174, the Hanzi syllables 164 occupy indexes 1 through 9 in the correspondence array 160. This number of Hanzi syllable variants can also be calculated as the difference between the offset at the index of the Hangul syllable to be replaced, 0 in this example, and the offset at the next index in the array of offsets, which is 10 in this example, less 1. The Hanzi syllable variants identified in the correspondence array are then displayed to the user, and the user then selects the intended Hanzi syllable, with which the Hangul syllable is replaced.

Frequency of use information could be stored for all Hangul syllables, a certain number of most frequently used Hangul syllables, or Hangul syllables having frequencies of use above a predetermined threshold. When frequency of use information for fewer than all Hangul syllables is stored, then searching speed of the frequency data structure 100 shown in FIG. 18 can be increased by providing a jumping table or similar data structure which indicates the position and size of any "gaps" in frequency of use information in the frequency data structure. FIG. 24 shows a jumping table for a frequency data structure. The jumping table 180 includes pairs of elements 182/184, 186/188, 190/192, as well as intervening elements not explicitly shown in FIG. 24. Each pair comprises a starting index and a length for each gap in a frequency data structure. Where the jumping table is used for searching the Hangul syllable frequency data structure, the first index 82 corresponds to the Unicode number or index of the first Hangul syllable for which no frequency of use information has been stored. The length then specifies the length of the gap, as either a number of entries or a Unicode number of the last consecutive Hangul syllable in the gap, for which no frequency of use information exists in the data structure. Using gap indexes and lengths in the jumping table, frequency of use information for a symbol can be located without sequentially searching the frequency data structure.

Where a Hangul syllable falls within one of the gaps indicated in the jumping table, the frequency data structure need not be searched at all. Otherwise, a section of the frequency data structure in which frequency of use information for the Hangul syllable is found is quickly identified based on the indexes and lengths of the gaps. Search speed for other frequency data structures may similarly be optimized, although the additional memory space required for storage of a further data structure is generally feasible only for relatively large data structures, for which sequential search time, and thus search time savings, can be significant.

The keyboards 10 and 30 are shown in FIGS. 7 and 8 for illustrative purposes only. Where an electronic device provides an auxiliary navigation input device such as a thumbwheel, for example, arrow keys 20 need not be provided on the reduced keyboard 10. Korean input systems and methods according to aspects of the invention are also independent of any particular key mapping on a reduced keyboard.

The components shown in the electronic device 150 are similarly illustrative, and an electronic device in which a Korean text input is enabled may include other components in addition to those shown in FIG. 22. These additional components are dependent upon the type of electronic device, but may include, for example, one or more of a wireless transceiver configured to operate within a wireless communication network, a voice communication module, a data communication module, a plurality of software applications, any of a plurality of types of communication interfaces, and a power source such as a battery. The various arrays and data structures described above may be loaded onto such an electronic device via any suitable interface, such as a wireless transceiver, a serial port, a Universal Serial Bus (USB) port, a disk drive or other memory reading device, an infrared port, an 802.11 module, or a Bluetooth™ module. Those skilled in the art will appreciate that "802.11" and "Bluetooth" refer to sets of specifications, available from the Institute for Electrical and Electronics Engineers (IEEE), relating to wireless local area networks and wireless personal area networks, respectively.

The invention claimed is:

1. A method for input of text symbols into an electronic device having a reduced keyboard, the reduced keyboard having keys representing a plurality of characters, comprising:
    receiving character inputs from the reduced keyboard;
    identifying symbol variants based on the received character inputs;
    displaying a list of symbol variants;
    selecting an input symbol from the list of symbol variants, wherein the input symbol is a Korean Hangul syllable;
    designating at least one Chinese Hanzi syllable to correspond to at least one Korean Hangul syllable; and
    replacing the Korean Hangul syllable with a Chinese Hanzi syllable.

2. The method of claim 1, wherein the Korean Hangul syllables and the Chinese Hanzi syllables are stored in a static array.

3. The method of claim 2, wherein an index in the array of Korean Hangul syllables is searchable to find a corresponding Chinese Hanzi syllable.

4. The method of claim 1, wherein a user invokes a syllable replacement function for replacing the Korean Hangul syllable with the Chinese Hanzi syllable.

5. The method of claim 1, wherein a list of Hanzi syllable variants are displayed to a user.

6. The method of claim 5, wherein a user selects a Hanzi syllable from the list of Hanzi syllable variants to replace the Korean Hangul syllable.

7. The method of claim 1, further comprising grouping each symbol variant in one of a plurality of groups of symbol variants according to a type of the symbol variant, each of the plurality of groups having an associated priority.

8. The method of claim 7, further comprising ranking the symbol variants within at least one of the groups of symbol variants in decreasing order of frequencies of use of the symbol variants.

9. The method of claim 8, wherein the list of symbol variants comprises the plurality of groups of symbol variants in order of decreasing priority.

10. The method of claim 9, wherein the symbol variants of the at least one of the groups of symbol variants are sorted by both priority and frequency of use.

* * * * *

UNITED STATES PATENT AND TRADEMARK OFFICE
CERTIFICATE OF CORRECTION

PATENT NO.       : 7,916,046 B2
APPLICATION NO.  : 12/651503
DATED            : March 29, 2011
INVENTOR(S)      : Vadim Fux It is certified that error appears in the above-identified patent and that said Letters Patent is hereby corrected as shown below:

In column 2, lines 20-21, "variants, a display;" should read --variants, and a display;--.

In column 3, line 3, "syllable that having" should read --syllable having--.

In column 3, line 57, "referred to a "jongseong" characters" should read --referred to as "jongseong" characters--.

In column 4, line 10, after "multiple-character key", insert --12--.

In column 5, lines 6-7, "leading consonant, medial vowel and trailing" should read --leading consonant, medial vowel and trailing--.

In column 5, lines 8-9, "syllable that having" should read --syllable having--.

In column 5, line 59, "composed the compound" should read --composed of the compound--.

In column 6, line 29, "characters sequences" should read --character sequences--.

In column 8, line 21, "enter key 38." should read --enter key 18.--.

In column 9, line 39, "translate" should read --translates--.

In column 10, line 36, "110, 112" should read --110/112--.

In column 10, line 50, "saving" should read --savings--.

In column 11, line 13, "consonants variants," should read --consonant variants,--.

In column 12, line 9, "step 22" should read --step 122--.

Signed and Sealed this
Twenty-fourth Day of May, 2011

David J. Kappos
*Director of the United States Patent and Trademark Office*

CERTIFICATE OF CORRECTION (continued)
U.S. Pat. No. 7,916,046 B2

In column 12, line 25, "When a Hangul" should read --When Hangul--.

In column 12, line 61, "embodiment a text input" should read --embodiment of a text input--.

In column 14, lines 19-20, "and list" should read --and a list--.

In column 16, line 57, "are then" should read --is then--.

In column 16, line 60, "Homonyms," should read --homonyms,--.

In column 17, lines 16-17, "user. In the keyboards." should read --user in the keyboards.--.

In column 18, line 21, "FIG. 22." should read --FIG. 21.--.